No. 619,651. Patented Feb. 14, 1899.
G. E. ADAMS.
TOOL FOR SETTING MEMBERS OF SEPARABLE FASTENERS.
(Application filed Oct. 6, 1898.)
(No Model.)
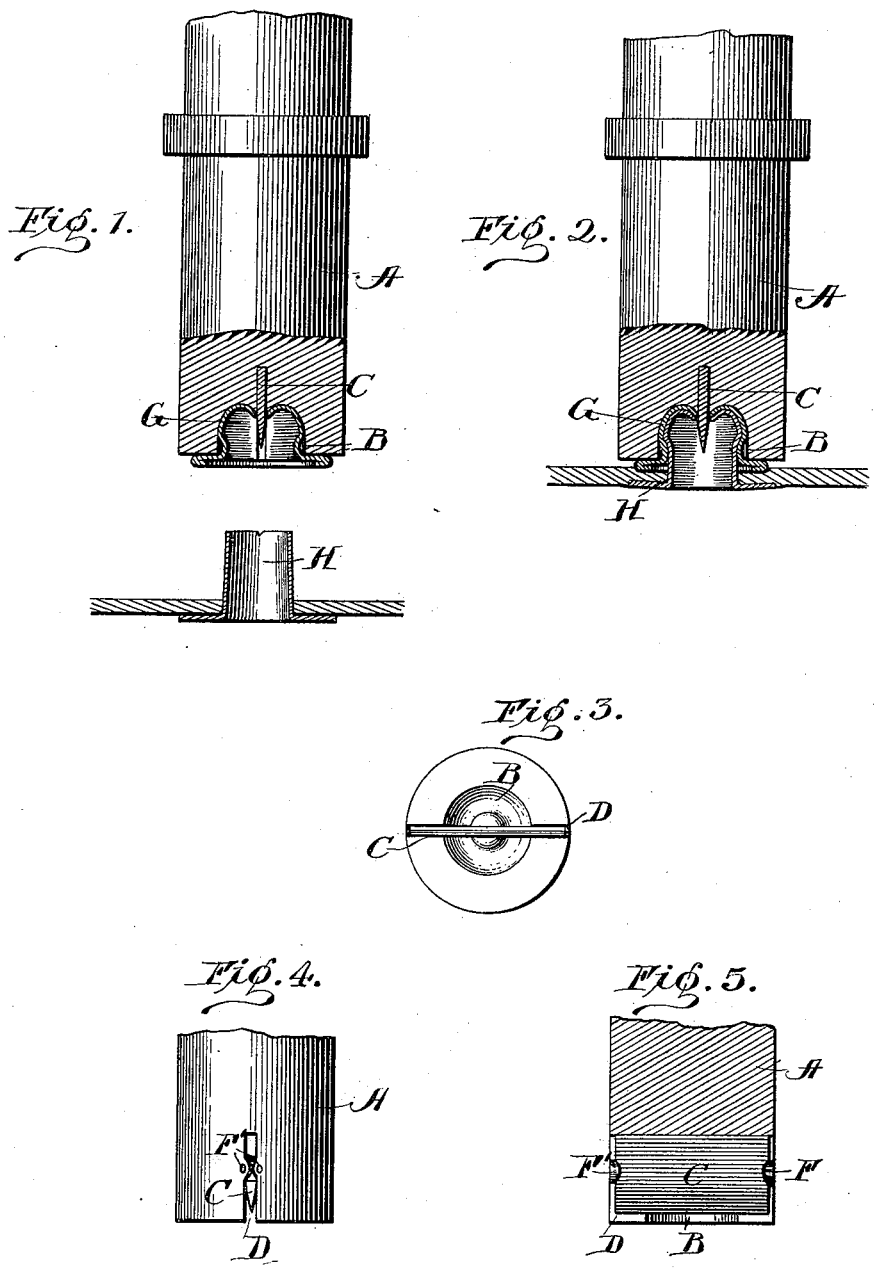
Witnesses:
J. M. Fowler Jr.
Alexander J. Stewart
Inventor:
George E. Adams,
by Church & Church
his Attorneys.

UNITED STATES PATENT OFFICE.

GEORGE E. ADAMS, OF NEW BRITAIN, CONNECTICUT.

TOOL FOR SETTING MEMBERS OF SEPARABLE FASTENERS.

SPECIFICATION forming part of Letters Patent No. 619,651, dated February 14, 1899.

Application filed October 6, 1898. Serial No. 692,832. (No model.)

*To all whom it may concern:*

Be it known that I, GEORGE E. ADAMS, a citizen of the United States, and a resident of New Britain, in the county of Adams and State of Connecticut, have invented certain new and useful Improvements in Tools for Setting Members of Separable Fasteners; and I do hereby declare the following to be a full, clear, and exact description of the same, reference being had to the accompanying drawings, forming a part of this specification, and to the letters of reference marked thereon.

This invention relates to improvements in tools or implements for use in forming or setting members of separable fasteners, such as glove-fasteners and the like; and the invention has for its object the production of a tool of simple construction by means of which the two parts or sections of a member of a separable fastener may at one operation be secured on the garment or goods and given their proper relative shape.

Referring to the accompanying drawings, Figure 1 is a vertical section through a tool with the sections of a member of a separable fastener before the sections are brought together. Fig. 2 is a similar view with the sections united and formed. Fig. 3 is a face view of the tool. Fig. 4 is a side elevation looking at the end of the blade. Fig. 5 is a section parallel with the blade.

Like letters of reference in the several figures indicate the same parts.

The tool illustrated is designed for setting stud members of separable fasteners, especially stud members having a resilient head such as is adapted to coöperate with a socket entrance-opening of fixed dimension in the coöperating member.

The tool-body is lettered A and may be given any shape desired such as will adapt it to be held by a chuck or tool post of a press if designed to be used in a machine or to be held in the hand when no machine is used.

The end of the tool is preferably made substantially flat, with a central cavity B, corresponding in shape to the external contour of the head of the stud member. Extending across this cavity B is a cutting-blade C, preferably mounted in a slot D formed in the end of the tool, the blade being in such position that its cutting edge is slightly below the level of the end of the tool and its rear edge seated firmly at the bottom of the slot. For holding the blade in place its ends may be recessed at F, and the edge of the slot may be set into these recesses at F' by a centerpunch or like implement.

In use the cap-section G of the stud member, having been preferably previously formed to fit the cavity and slotted, is placed in the cavity, the coöperating section H has its barrel passed through the goods to which the device is to be applied, and the said barrel is then forced up into the cap-section, whereby the said barrel is split by the blade and its sections forced away from each other and bulged out into the head of the cap-section to unite the two sections firmly and clamp the goods between them. It will be noted that the blade insures the positioning of the slits of both sections of the stud member, and thus both the sections of the barrel and cap are so united as to move in unison when the stud is passed through the aperture of the socket member, and said blade also forms a stop which will prevent any portion of the said barrel bridging or doubling across the slit in the head during the formation of the device.

Obviously the number of blades employed is immaterial, but I prefer the use of a single blade.

Having thus described my invention, what I claim as new, and desire to secure by Letters Patent of the United States of America, is—

1. A tool, for setting members of separable fasteners, having a body portion provided with a concavity conforming to the external contour of the cap-section of the member to be set, and a flat blade extending across said cavity for positioning the registering slits in the sections forming the members of the fastener; substantially as described.

2. A tool, for setting members of separable fasteners, said tool having a body portion provided with a concavity conforming to the external contour of the cap-section of the members to be set, and with a slot intersecting the said cavity longitudinally of the toolbody, and a cutting-blade mounted in said slot with its cutting edge toward but lying within the plane of the mouth of the cavity; substantially as described.

GEORGE E. ADAMS.

Witnesses:
WM. A. PIMM,
S. L. FINNIGAN.